(12) United States Patent
Dent (10) Patent No.: US 6,320,914 B1
(45) Date of Patent: *Nov. 20, 2001

(54) SPECTRALLY EFFICIENT MODULATION USING OVERLAPPED GMSK

(75) Inventor: Paul W. Dent, Pittsboro, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,263

(22) Filed: Dec. 18, 1996

(51) Int. Cl.[7] .................................................. H04L 27/12
(52) U.S. Cl. ........................................... 375/302; 375/305
(58) Field of Search ...................... 375/305, 308, 375/302, 261, 280, 281, 332, 269, 279, 298, 329, 271, 283, 340, 341, 336, 274, 303; 332/103

(56) References Cited

U.S. PATENT DOCUMENTS

| | | | |
|---|---|---|---|
| 4,613,976 | * 9/1986 | Sewerinson et al. ................... 375/52 |
| 5,136,616 | 8/1992 | Dent . | |
| 5,237,324 | * 8/1993 | Linz et al. ........................... 341/147 |
| 5,285,479 | * 2/1994 | Iwane .................................... 375/298 |
| 5,331,666 | 7/1994 | Dent . | |
| 5,425,055 | * 6/1995 | Blaker .................................. 375/279 |
| 5,530,722 | 6/1996 | Dent . | |
| 5,548,253 | * 8/1996 | Durrant ................................. 332/103 |
| 5,557,645 | * 9/1996 | Dent ..................................... 375/340 |
| 5,566,210 | * 10/1996 | Saito et al. ............................ 375/329 |
| 5,568,518 | 10/1996 | Dent . | |
| 5,610,940 | * 3/1997 | Durrant et al. ........................ 375/208 |
| 5,627,499 | * 5/1997 | Gardner ................................ 332/101 |
| 5,638,401 | * 6/1997 | Jones .................................... 375/298 |
| 5,640,692 | * 6/1997 | Bothorel ............................... 455/127 |
| 5,673,291 | * 9/1997 | Dent ..................................... 375/262 |
| 5,784,412 | * 7/1998 | Ichihara ................................ 375/302 |
| 5,818,867 | * 10/1998 | Rasmussen et al. .................. 375/146 |
| 5,838,208 | * 11/1998 | Fukushi ................................ 332/101 |
| 5,942,955 | * 8/1999 | Matui ................................... 332/101 |
| 5,999,569 | * 12/1999 | Oshima ................................ 375/265 |

FOREIGN PATENT DOCUMENTS

| | | |
|---|---|---|
| 425 458 B1 | 5/1991 | (EP) . |
| 465 782 | 1/1992 | (EP) . |
| 617 196 | 9/1994 | (EP) . |
| 649 230 | 4/1995 | (EP) . |

OTHER PUBLICATIONS

R.A. Meyers and P.H. Waters, "Synthesiser Review For Pan–European Digital Cellular Radio", IEE Colloquium on VLSI Implementation For Second Generation Digital Cordless and Mobile Telecommunications System, No. 043, London, UK, pp. 8/1–8/10, 1990.*

(List continued on next page.)

Primary Examiner—Don N. Vo
(74) Attorney, Agent, or Firm—Burns, Doane, Swecker & Mathis, L.L.P.

(57) ABSTRACT

A method and apparatus for predicting signal values for signals that have not yet been received wherein the information stream transmitted has been divided into a first stream and a second stream. A first Q component is predicted based on values stored in a state memory for the first bit stream. A first I component is predicted using the first predicted Q component and a previous bit from the state memory for the first bit stream. Then, a second Q component is predicted based on values in the state memory for the second bit stream. A second I component is then predicted using the second predicting Q component and the previous bit from the second bit stream. The first I component and the second Q component are added to obtain a combined I value and the first Q component and the second I component are added to obtain a combined Q value. Finally, the combined I value, the combined Q value, and a channel coefficient inputted into a complex multiplier, wherein the complex multiplier outputs a signal predicting value.

8 Claims, 10 Drawing Sheets

OTHER PUBLICATIONS

L. Hanzo, "The Pan–European Cellular System", The Mobile Communications Handbook, edited by J.D Gibson, CRC Press, p. 410, 1996.*

T. Riley, "A Simplified Continuous Phase Modulator Technique", IEEE Transactions On Circuits and Systems –II: Analog and Digital Signal Processing, vol. 41, No. 5, pp. 321–328, May 1994.*

A. H. Aghvami, "Digital Modulation Techniques For Mobile And Personal Communication Systems", Electronics and Communication Engineering Journal, pp. 125–132, Jun. 1993.*

G.D. Forney, Jr., "Maximum Likelihood Sequence Estimation of Digital Sequences in the Presence of Intersymbol Interference," *IEEE Transactions on Information Theory,* vol. IT18 No. 3, May 1972, pp. 363–378.

C. Brown et al., "Cross–Correlated Correlative FQPSK Modulation Doubles the Capacity of PCS Networks," *IEEE 46th. Vehicular Technology Conference,* Apr.–May 1996, pp. 800–804.

P.J. McLane, "The Viterbi Receiver for Correlative Encoded MSK Signals," *IEEE Transactions on Communications,* vol. 31, No. 2, Feb. 1983, pp. 290–295.

I. Korn et al., "$Q^2$DPSK in the Satellite Mobile Channel with ISI and CSI," *Proceedings of the International Conference on Communications,* May 23–26, 1993, pp. 1713–1717.

X.–H. Chen, "Convoluted Raised–Cosine and Triangular––Cosine (RCTC) Modulation and its Performance Against Timing Jitter over Noisy Channels, " *Electronics letters,* vol. 29, No. 4, Jul. 8, 1993, pp. 1239–1240.

* cited by examiner

FIG. 1(a)

PRIOR ART

FIG. 1(b)

PRIOR ART

SPECTRALLY EFFICIENT MODULATION USING OVERLAPPED GMSK

FIELD OF THE INVENTION

The invention relates to an apparatus for transmitting digital information streams in a bandwidth-efficient manner. Such a need arises for example in digital wireless telephone systems that transmit digitally coded speech and wish to obtain the highest amount of traffic in an allocated radio band. The invention may also be applied to transmitting digital data along telephone lines using MODEMs.

BACKGROUND OF THE INVENTION

Minimum Shift Keying (MSK) is a known binary modulation that impresses binary information bits onto a radio frequency carrier by rotating the phase smoothly through either +90° of −90° from its previous value according to the polarity of the information bit being transmitted. Thus, the phase nominally lies at 0 to 180°at the end of even bits and 90 or −90 ° at the end of odd bits. With suitable precoding, it may be arranged that an even bit B(2i) is represented always by a terminal phase of 0° for a '1' and 180 °for a '0', and that odd bits B(2i+1) are represented by 90° for a '1' and −90° for a '0'.

In MSK, the phase rotates smoothly at a constant rate in either a clockwise or anticlockwise direction. The constant rate of change of phase represents either a positive frequency offset or a negative frequency offset from the nominal radio carrier frequency. The frequency offset changes abruptly when the data polarity changes the direction of phase rotation.

In a known variant of MSK, called Gaussian Filtered Minimum Shift Keying (GMSK), a Gaussian filter is used to smooth the frequency transitions so that the phase rotation does not exhibit abrupt changes of direction. This smoothing effect by the Gaussian filter reduces the spectral energy in neighboring radio frequency channels and improves adjacent channel interference characteristics, at the expense of rounding the data transitions so that after a data '1' or '0' the phase may not quite reach the expected end points, with a consequent slight loss of noise immunity. A Gaussian filter was found expirically in the past to reduce adjacent channel energy the most for a given amount of rounding loss. The GMSK modulation technique is used in the European GSM cellular phone system.

GMSK is a constant amplitude modulation where the signal only varies in phase. Better spectral containment may be obtained by a so-called linear modulation where the amplitude is permitted to vary. The spectral efficiency may be measured in bits per second per Hertz of transmission bandwidth. The spectral efficiency may be increased by using quaternary modulation instead of binary modulation. For example, two bits at a time may be combined to form quaternary symbols with a value of 0, 1, 2, or 3, which are conveyed by transmitting a signal phase of 0, 90, 270, or 180°, respectively. Such a modulation is called Quadrature Phase Shift Keying (QPSK). Alternatively, the four phases, also known as constellation points, may be systematically shifted through 45 degrees between successive symbol periods so that even symbols are represented by 0, 90, 270, or 180° while odd symbols are represented by 45, 135, −135, or −45°. This alternative modulation is called Pi/4-QPSK. When in Pi/4-QPSK, the data symbol is represented by the change in phase from the previous value to the next value, being one of the four rotations +/−45 or +/−135°, it is known as Differential Pi/4-QPSK or Pi/4-DQPSK. QPSK, Pi/4-QPSK and Pi/4-DQPSK may all be regarded as time varying vectors in the two-dimensional complex plane that have a time varying real coordinate (I) and a time varying imaginary coordinate (Q). If the I and Q waveforms are separately linearly filtered, the spectral containment can be as good as the filter characteristics can be made but at the expense of introducing amplitude modulation, which is harder to transmit than pure phase modulation. Nevertheless, I-Q filtered Pi/4-DQPSK is the modulation used in the US digital cellular system IS-54. The IS-54 modulation achieves 1.62 bits per second per Hertz of channel bandwidth while GSM achieves 1.35 bits per second per Hertz.

Yet another modulation uses the four phase shifts +/−45 and +/−135° to represent a quaternary symbol (bit pair), but smoothes the phase changes in the same way as GMSK to provide spectral containment without introducing amplitude modulation. The technique, called 4-ary CPM, is neither as spectrally efficient nor power efficient as Pi/4-DQPSK, however.

The current invention differs from all of the above in first producing two binary-modulated, constant envelope GMSK signals using a first half A(1), A(2). . . A(n) of the total number of information bits to be conveyed for the first GMSK signal and a second half B(1), B(2). . . B(n) of the total information bits to modulate the second GMSK signal.

SUMMARY OF THE INVENTION

A first binary data stream of B bits per second is impressed on a radio carrier using GMSK to provide a transmission which alone would achieve a spectral efficiency of about 1.35 bits per second per Hertz. A second binary data stream of B bits per second is modulated in a similar fashion on the same carrier frequency but with a 90° phase shift from said first radio carrier. The two modulated carriers are then linearly added to form a radio signal modulated with 2B bits per second achieving a spectral efficiency of 2.7 bits per second per Hertz. The sum signal is a non-constant envelope signal that carries information largely in its phase but also in its amplitude changes. The signal resembles a four-phase signal and may be received using a Viterbi equalizer adapted for resolving bit pairs.

An information stream or bit-block to be transmitted is divided into a first half comprising bits labelled A(1), A(2) . . . A(n) and a second half comprising bits labelled B(1), B(2) . . . B(n). The A-half bits are used to modulate a first GMSK signal and the B-half bits are used to modulate a second GMSK signal on the same carrier frequency, but having a 90° phase difference to the first carrier. The two GMSK signals are then added to form the inventive modulated signal,which will be referred to hereinafter as "Quadrature Overlapped GMSK" or QO-GMSK for short.

Even numbered bits of the A-half, A(2i), cause the first GMSK signal to adopt nominal terminal phase values of 0 to 180° while odd numbered bits A(2i+1) causes nominal terminal phases of +/−90°. On the other hand, even numbered bits B(2i) of the B-half cause the second GMSK signal to adopt terminal phases of nominally +/−90° at the same time as the first GMSK signal is at nominally 0 to 180°. Likewise, odd numbered bits B(2i+1) of the B-half cause the second GMSK signal to adopt nominally 0 to 180° terminal phases at the same time as the first GMSK signal is at nominally +/−90°. In this way, the two GMSK signals are made distinct from one another and thus both the A-bits and the B-bits can be distinguished in the received signal.

The Gaussian filtering of each individual GMSK signal causes departures from the nominal phase values and thus the two GMSK signals are not perfectly separated. Nevertheless, an equalizer may be used to resolve the interference of one GMSK signal to the other GMSK signal. The preferred type of equalizer for use with the invention is a Viterbi maximum likelihood sequence estimator (MLSE), which postulates sequences of bit pairs each comprising one A-bit and one B-bit. Typically, three consecutive bit-pairs are postulated to predict the instantaneous complex vector value of the QO-GMSK signal. The actual signal values are compared with predicted signal values in a Viterbi MSLE processor to compute a cumulative mismatch value or path metric for each postulated sequence bit pairs, the sequence finally having the lowest path metric being outputted as the most likely sequence of bits pairs, thus demodulating the QO-GMSK signal.

When practicing the present invention, a communications system achieves a spectral efficiency of 2.7 data bits per second per Hz of channel bandwidth, which is a considerable improvement over the 1.6 bits per second per Hz of linear PI/4-QPSK.

BRIEF DESCRIPTION OF THE DRAWINGS

These and other features and advantages of the invention will be readily apparent to one of ordinary skill in the art from the following description, used in connection with the drawings, in which.

DETAILED DESCRIPTION

Figure 1A:
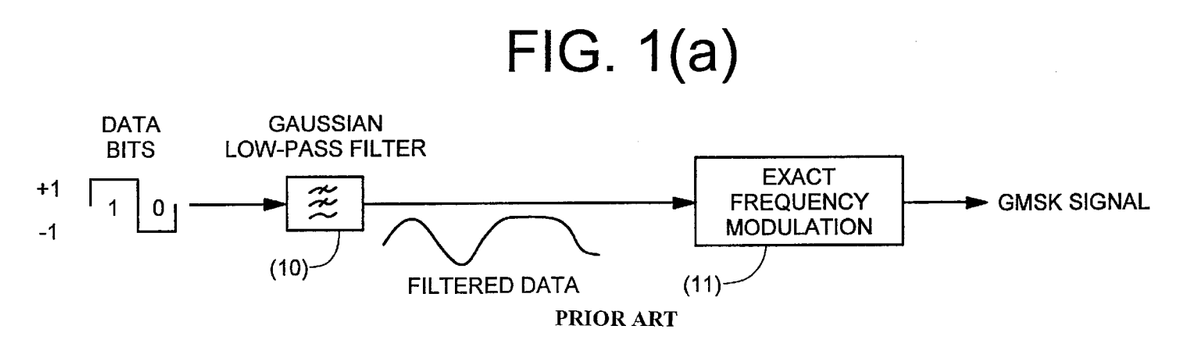
FIGS. 1(a)–1(b) illustrates a prior art GMSK modulator.

FIGS. 1(a)–1(b) illustrate two prior art methods of producing a GMSK modulated signal. In FIG. 1(a), a data signal takes on +1 signal values for a binary '1' and alternatively −1 for signal values binary '0's. The data signal is passed through a low-pass filter 10 which has a Gaussian filter response to produce a rounded frequency-modulating waveform. If the Gaussian filter has a DC gain of unity, the filtered data values will peak at +1 for a long series of continuous binary '1s' applied to the input, or −1 for a series of binary '0's.

The rounded frequency-modulating waveform is applied to an exact frequency modulator 11 which generates a frequency (Fo +bitrate/4) for a value of +1 at its input and (Fo-bitrate/4) for a value of −1 at its input. The frequency deviation of +bitrate/4 corresponding to +1 at its input causes one quarter of a cycle (i.e., 90°) change in phase over one bit period, while an offset of −bitrate/4 causes a change in phase of −90° over a bit period. It is important for these frequency offsets to be exact or else there will be a cumulative deviation of the signal phase value from its expected phase when a series of '1's or '0's is applied at the data input. For this reason, the use of direct frequency modulation is not a favored method of generating GMSK.

Figure 1B:
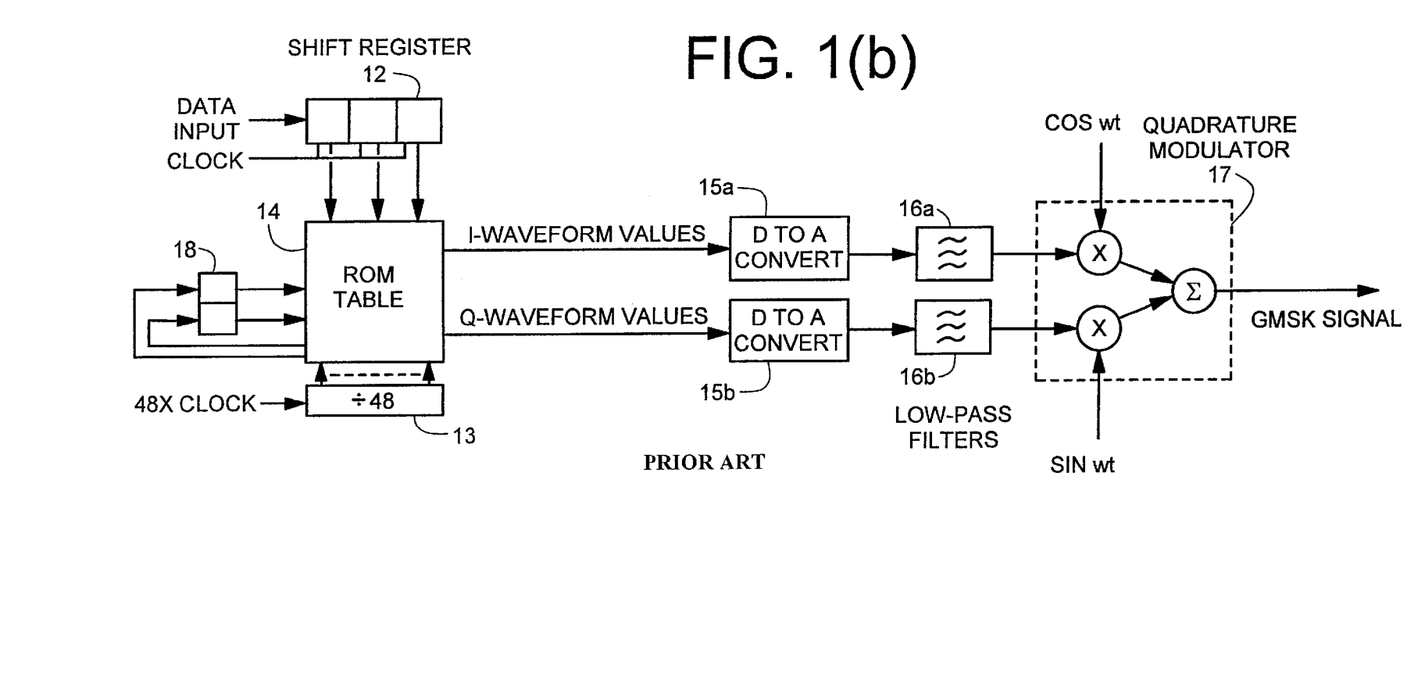

FIG. 1(b) illustrates the I,Q method of generating a GMSK signal, and furthermore illustrates the "ROM modulator" technique described in U.S. Pat. No. 5,530,722, which is hereby incorporated by reference herein. The ROM modulator is based on the fact that the rounding effect of the Gaussian filter has a limited memory. In other words, the effect of a previous bit on the waveform does not last for more than a few bits before it dies away. For example, the instantaneous value of the filtered waveform may not be affected substantially by more than the current bit, the previous bit and the subsequent bit. When the waveform only depends substantially on three successive bit values, there can only be eight different waveforms and these eight waveforms can be precomputed and stored numerically in a Read Only Memory (ROM) 14.

Data bits are input into a shift register 12 and the three most recent bits (for example) are applied as an address to the ROM 14 in order to select the desired waveform from the eight stored waveforms. Each waveform may consist, for example, of a series of 48 points equispaced over a bit period. In that case, a 48 xbitrate clock drives a divide-by-48 counter 13, the output lines of which are also applied as address bits to the ROM 14 in order to select each waveform point in turn. Thus, 48 waveform points are selected in the correct sequence during each bit period. A two-bit latch 18 keeps track of which quadrant the phase was last rotated into, as the GMSK modulation is modulo-2Pi phase-cumulative.

The selected waveform points consist of numerical values and are converted to analog signal waveforms by D-to-A convertors 15a, 15b followed by smoothing filters 16a, 16b. The waveforms produced represent the cosine of the desired instantaneous signal phase and the sine of the desired signal phase respectively, commonly known as I (In-phase) and Q (Quadrature) signals. A quadrature modulator 17 multiplies a cosine wave at the desired radio carrier frequency by the I signal to output the correct amount of cosine wave signal and also multiplies a sine wave carrier signal by the Q waveform to output the desired amount of sine wave signal. After summing the cosine and sine outputs, a signal vector having the desired sequence of instantaneous phase values is produced.

GMSK is a constant-envelope signal and so the ROM-stored I and Q waveform values generally have the property that:

$$I^2 + Q^2 = \text{constant}$$

The ROM modulator may also be used to produce non-constant envelope signals, however, by simply storing the desired I and Q waveforms without necessarily constraining them by the above relation.

Figure 2:
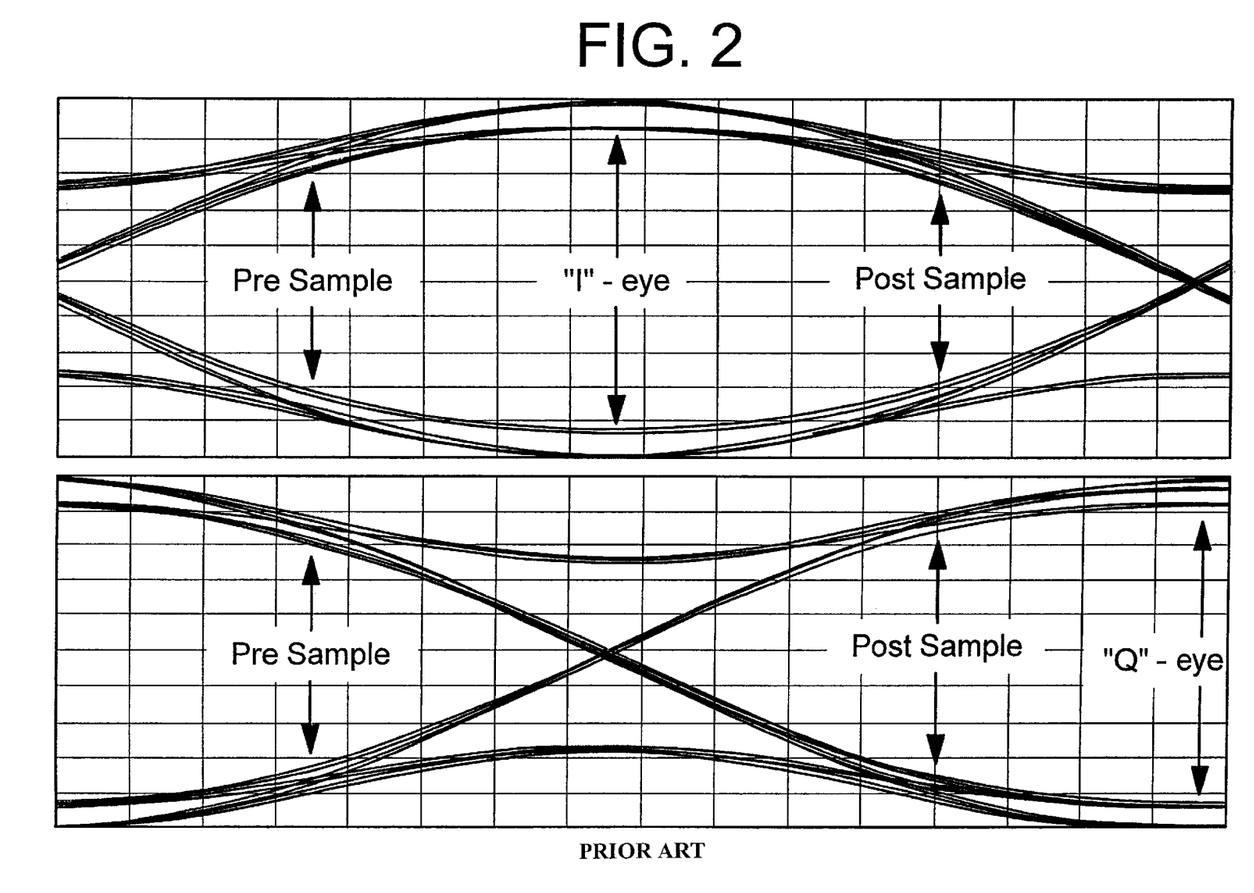
FIG. 2 illustrates typical prior art GMSK waveforms.

FIG. 2 shows the typical I and Q waveforms of a GMSK signal with a Gaussian filter of −3 dB bandwidth equal to 0.3 of the bitrate (BT=0.3). These waveforms are sometimes known as the eye-diagrams because of their distinctive shape. The upper "eye" opening is produced by even bits taking on values of alternatively +1 or −1 while the lower eye openings are displaced by +/−1 bit period, as they are due to odd data bits. Such a GMSK signal may be decoded by noting the signs (up or down) of the I-waveform at the optimum eye opening for even bits and noting the signs of the Q-waveform at instants between to determine the polarity of odd bits. Thus, when determining an even bit from I-waveform values, the fact that the Q-waveform is not necessarily zero at that instant is irrelevant, and does not affect the determination of the even bits.

Further analysis of the waveforms of FIG. 2 indicates that the Q-waveform at the center of an even-bit A(2i) eye opening may be approximated to:

$$Q(2i) = 0.25 [A(2i-1) + A(2i+1)] \quad \text{EQUATION (1)}$$

Figure 3:
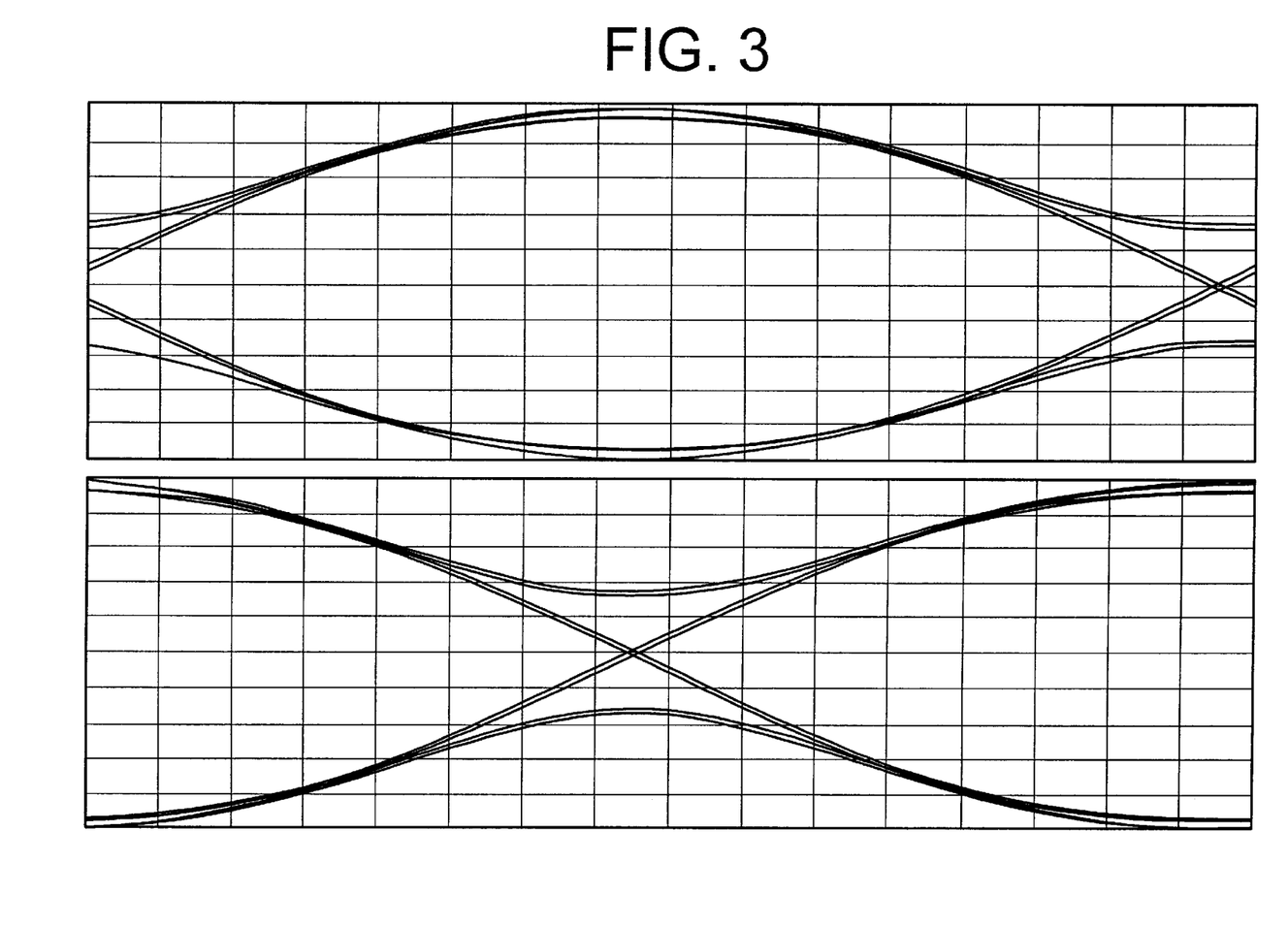
FIG. 3 illustrates typical prior art GMSK waveforms.

Thus, when A(2i−1) and A(2i +1) are of opposite polarity, the Q-waveform will pass through zero at the center, while when they are the same polarity, the Q-waveform dips to approximately either +0.5 or −0.5. The latter values are coincidental for the exemplary Gaussian filter BT product of 0.3 chosen above and values greater or less than +/−0.5 may occur for other filters or BT products, as shown by FIG. 3 for GMSK with BT=0.5. The I-waveform at the center of the eye opening is almost equal to A(2i).

More exactly, since $I^2 + Q^2 = 1$ (with the exemplary scaling), values of exactly +/−1 can only be reached when the Q-waveform passes through zero. When the Q-waveform is not zero, the I-waveform can be represented by:

$$I(2i) = A(2i) [1 - Q^2(2i)]^{1/2} \quad \text{EQUATION (2)}$$

where Q(2i) may be substituted by the expression of equation (1) thus obtaining an expression for I(2i) that depends on A(2i−1), A(2i) and A(2i+1).

Bit A(2i) affects I(2i) most while A(2i−1) and A(2i+1) affect the value of I(2i) somewhat less and only through the square of their sum, which only takes on the values of zero or +4. Hence, I(2i) only takes on one of the four values +/−1 (when Q(2i)=0) or +/−root(3)/2 (when Q(2i)=+/−0.5).

It may be seen that these values of I(2i), Q(2i) correspond to phase rotations over a bit period of +/−90° or to the reduced values of +/−60° caused by the Gaussian rounding of the frequency transitions. The +/−60° partial phase rotations produced are coincidental to the choice of 0.3 for the Gaussian filter BT product, and other BT products will produce other values of partial phase rotation. GMSK indeed belongs to the class of modulations known as "partial response signalling."

At odd sampling instants (2i+1), the values of I(2i+1) and Q(2i+1) are related in a similar fashion to the three surrounding bit values A(2i), A(2i+1) and A(2i+2), except that the formulae for I and Q are interchanged, the eye opening for odd bits appearing on the Q-channel. Thus, as is shown above, the expected values of I and Q at a given sampling instant may be predicted by hypothesizing three consecutive bits. Predicted values may be compared with received values to determine the most likely hypothesis and thereby decode the signal.

When the signal propagates from the transmitter to the receiver, it can suffer a number of perturbations including attenuation, an arbitrary phase rotation and sometimes the addition of delayed echoes. It is necessary at least to determine the received amplitude and the phase shift introduced in the propagation path in order to obtain a fair comparison between predicted and received values. The predicted values are then rotated by this phase shift and scaled to the appropriate amplitude before comparison with received values. Both scaling and phase rotation are achieved simultaneously by multiplying predicted values by a complex number representing the phase shift and amplitude attenuation introduced by the propagation path, the complex number then being known as a "channel coefficient." The channel coefficient may be determined by including a pattern of known data symbol bits called the "syncword" in the transmitted sequence and correlating the received signal with an expected signal computed from the known syncword. The correlation result yields the channel coefficient required.

It is also possible to account for additive delayed echoes by also correlating with shifted versions of the expected syncword signal. This yields channel coefficients for the delayed echoes which may be used together with the channel coefficients for the direct wave to predict the received signal I, Q values for a given hypothesis of the unknown data bit sequence.

The broad principle of a device belonging to the known art is to use a linear, finite impulse response model consisting of a tapped delay line with complex multiplicative weights (the channel coefficients) applied to the tap signals, the weighted tap signals being summed to predict the expected received signal I,Q value. Using a weighted sum of delayed bit polarities is supposed to account for both the dependence of the transmitted I, Q waveforms on a number of consecutive bit values as well as the propagation path echoes. In view of the non-linear dependence of GMSK I, Q waveforms on consecutive bits given by equations (1) and (2), the use of a linear weighted sum is an approximate model of the transmitter and propagation path, which nevertheless works reasonably well for conventional GMSK.

When the channel coefficients are stable over a period of demodulation of several data bits, the predictions for all possible data bit values that could fill the tapped delay line may be precomputed and stored in a lookup table. The number of possible values is equal to two-to-the-power of the number of binary bits required to fill the delay pipeline. Bits outside this delay spread window do not affect the current signal value but affect previous or future values. Thus, the prior art GMSK receiver approximates GMSK as a linear sum of weighted delayed bit sequences and does not use the more accurate non-linear expressions of equations (1) and (2) above. The linear approximation gives a small but normally tolerable degradation in noise immunity, manifesting itself as a slightly higher bit error rate out of the demodulator.

Figure 4:
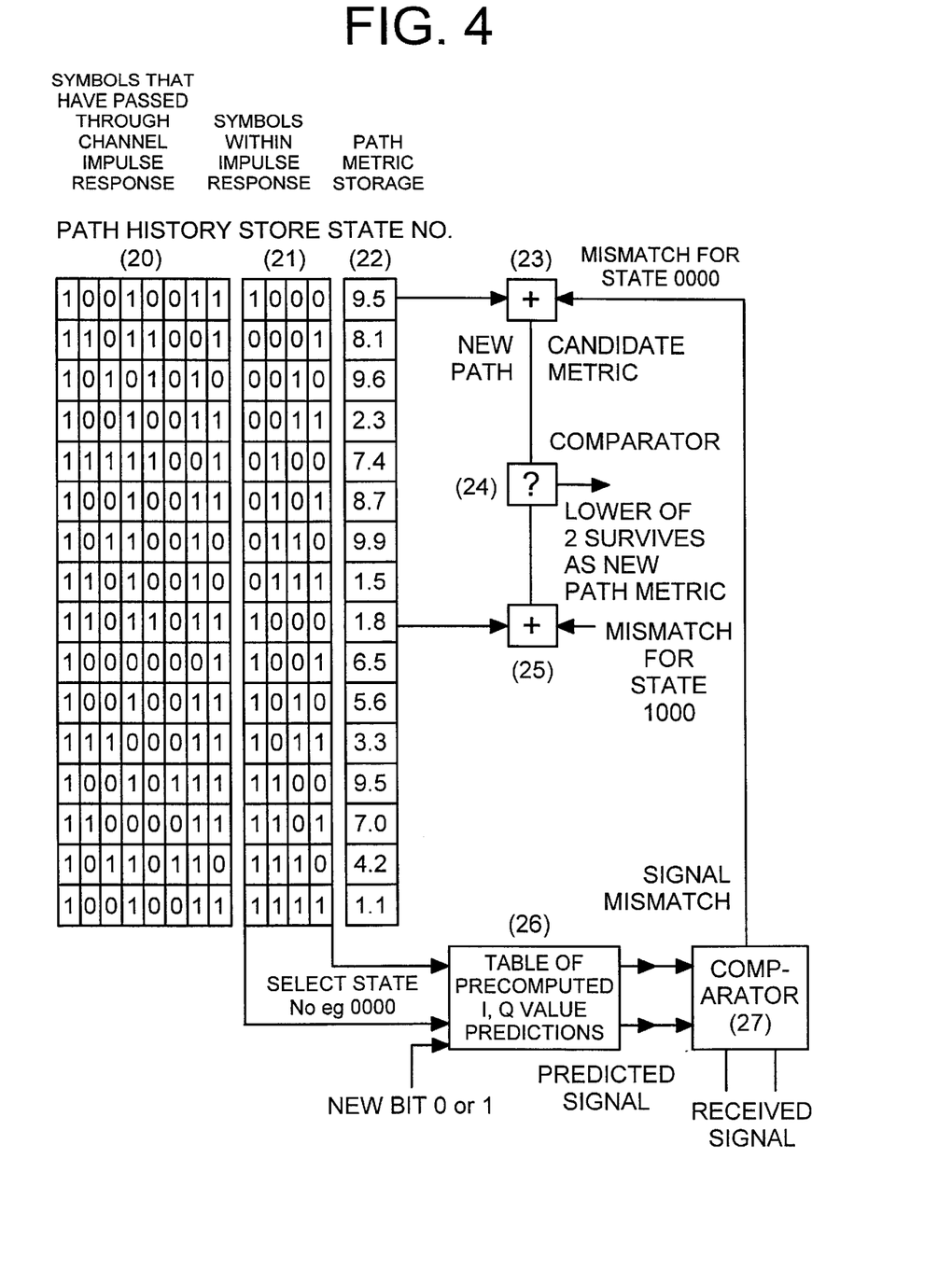
FIG. 4 illustrates a Viterbi MSLE demodulator suitable for GMSK.

FIG. 4 illustrates a Viterbi MSLE demodulator suitable for GMSK. A state memory 21 comprises all possible patterns of four consecutive bits in the exemplary arrangement of FIG. 4, although more or less bits could be used depending on the delay spread of echoes anticipated. Each "state" or four-bit pattern is selected in turn together with a new bit hypothesis, and the five bits are applied as an address to a look-up table 26 to select one of 32 precomputed signal predictions corresponding to the assumption that the propagation path delay spread and transmit modulation combine to make each I, Q waveform point depend on five consecutive bits. The prediction from the look-up table 26 is applied to a comparator 27 along with the received signal I, Q value and the squared magnitude of the complex vector mismatch is determined in an adder 23 and adds the previous cumulative path metric for state 0000 (for example) to the newly-computed mismatch from the comparator 27 for state 0000 and a new bit prediction of '0' to obtain a candidate value for the new cumulative path metric. An adder 25 likewise computes a candidate new cumulative path metric for state 1000 followed by a new bit prediction of '0'. The two candidates for the new cumulative path metric are compared in a comparator 24 and the lower value is selected. This indicates whether state 0000 or state 1000 is the best predecessor state to lead to a new state 0000 when the newly-hypothesized '0' bit is left-shifted into the rightmost position of the four-bit state number and the leftmost bit of the state number (1 or 0) shifts out into the path history memory to record which of the two predecessor states (1000 or 0000) was selected. The left-shifted path history of the selected state then becomes the new path history of new state 0000, called the successor state to predecessor state 0000 and 1000. The above is repeated for a new bit hypothesis of '1' in order to generate a new successor state 0001, and is also repeated using other pairs of predecessor states that only differ in the leftmost bit of their state numbers, such as 0100 and 1100 (generating successor states 1000 and 1001) until all successor states have been produced and the path history stores have lengthened by one bit. If the oldest (leftmost) bits in all path history stores agree, that bit value may be extracted as a finally decoded bit and the path histories are shortened. Otherwise, if there is a need to truncate the growth of past history before all oldest bits agree, the oldest bit from the state having the lowest cumulative path metric is output, and the path histories are all shortened by one bit.

When the channel coefficients are not static over a large number of data bit periods, it may not be worthwhile to precompute the entire prediction look-up table 26, as it may have to be changed too frequently. Instead, the predictions may be computed on the fly from channel coefficients, wherein the channel coefficients are updated as demodulation progresses, by for example, any of the methods described in European Patent No. 425548B1. The best methods maintain a separate set of channel coefficients for each state. When one of a number of possible predecessor states is determined to be the best predecessor to a new (successor) state as described above with the aid of FIG. 3, the channel coefficients of the best predecessor state are selected and updated to become the channel coefficients for the new state. In this way, it is ensured that the surviving channel coefficients are always derived from the best demodulated data sequences to date and not derived from wholly erroneous assumptions of the underlying data.

U.S. Pat. No. 5,331,666 describes a variation of the adaptive Viterbi equalizer that does not update channel coefficients, but instead updates the signal predictions stored in the look-up table 26 directly without first going through the intermediate step of updating channel coefficients. U.S. Pat. No. 5,133,666 and European Patent No. 425 548B1 are both incorporated herein by reference.

The known Viterbi MLSE demodulator thus incorporates a number of steps. First, the tap coefficients for a finite impulse response model of the channel are determined. This means predicting the coefficients c1, c2, c3 in the equation $$Si = c1 \cdot Di + c2 \cdot D(i-1) + c3 \cdot D(i-2)$$

where Di, D(i-1), D(i-2)... is any postulated data symbol sequence and Si is the signal that the model predicts for that sequence. The coefficients are usually calculated from the known training pattern embedded in the transmission. Secondly, the coefficients determined above are used to predict the signal waveform that should be received for all possible data bit sequences Di, D(i-1), D(i-2)... The number of predictions is 2 to the power of the number of bits involved in the prediction equation, in the case of binary signalling. Next, the predictions are compared with received signal samples and the mismatch is calculated, usually the square of the distance apart in the complex plane. The mismatch is then added to the previous cumulative mismatch of previous sequences consistent with each new prediction. The cumulative mismatch values are called "path metrics." Finally, the best of the possible predecessor sequences that can transition to each new state is chosen based on which gives the lowest path metric for the new state.

When no path echoes of significant delay exist, and the only dependence of I, Q values on data bits is given by equations (1) and (2), only a single channel coefficient describing the path attenuation and phase shift, that is the received signal amplitude and phase, is needed. U.S. Pat. No. 5,136,616 describes means to track the signal phase and frequency and is incorporated herein by reference. U.S. Pat. No. 5,568,518describes preferred means to track both the received signal phase and amplitude, and is also incorporated herein by reference.

Figure 5:
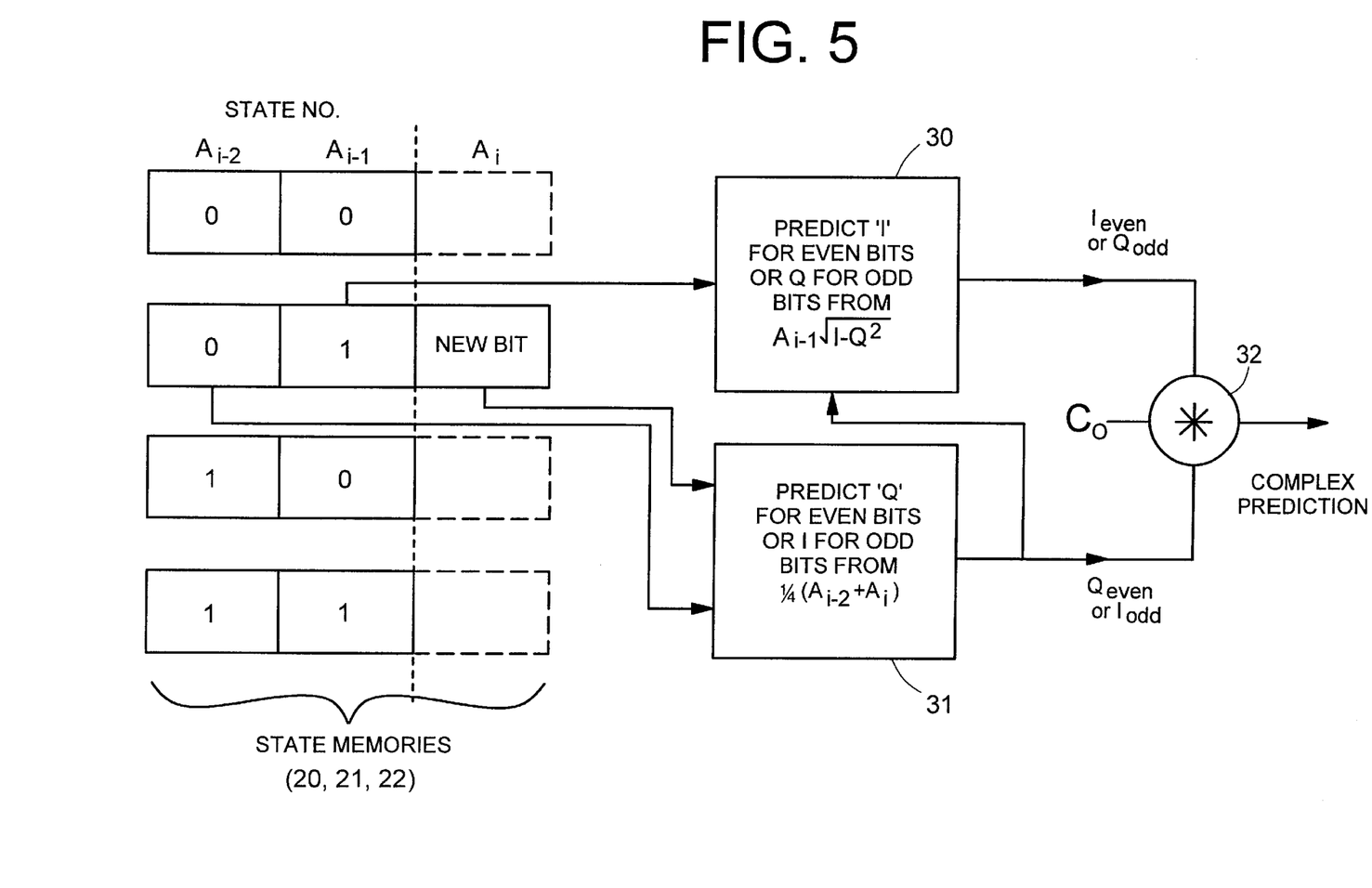
FIG. 5 illustrates non-linear prediction for GMSK demodulation using only one channel coefficient.

When only a single channel coefficient is needed due to the insignificance of delayed echoes, it may be used together with equations (1) and (2) to provide a GMSK demodulator of improved performance. Since the received signal depends only on three consecutive bits (two previous bits and one new bit) the number of states required in an MSLE demodulator such as the demodulator exemplified in FIG. 5 may be reduced to four. FIG. 5 shows more detail of the prediction unit 26 for this case. To predict the I, Q value for state No. (01), for example, in conjunction with a hypothesized new bit, the three bits are used in I, Q signal predictors 30, 31 as follows. The two outer bits labelled A(i–2) and A(i) (the new bit) are applied to Q-signal predictor 31 where equation (1) is computed to yield a prediction for the Q-value of even bits or the I-value of odd bits. The center bit labelled A(i–0) is applied to I-signal predictor 30 together with the just computed value from Q-signal predictor 31 in order to compute equation (2) to yield a prediction of the I-value for even bits or Q-value for odd-bits. The predicted I, Q values are read to the complex multiplier 32 together with the channel coefficient labelled Co that describes the propagation path phase shift and amplitude attenuation, and the complex product is output as the signal prediction to be compared in comparator 27 with the actual received signal values. The value of Co may be estimated by a syncword correlation as described above and updated as necessary using for example the methods described in U.S. Pat. No. 5,568,518.

In practice, even when the propagation path does not comprise intersymbol interference (ISI) caused by delayed echoes, the inevitable use of a bandpass filter to restrict noise in the receiver will itself introduce ISI. Filter and propagation path ISI may both be accounted for by using the prediction method of FIG. 5 with input bit-triples $(A(i-3), A(i-2), A(i-1))$ to obtain prediction P1;

$(A(i-2), A(i-1), A(I))$ to obtain prediction P2;

and $(A(i-1), A(i), A(I+1))$ to obtain prediction P3.

The three predictions are then combined by using channel coefficients C1, C2, and C3 which describe the impulse response of the channel plus the receiver filter to obtain the overall prediction $P = C1*P1 + C2*P2 + C3*P3$.

The improvement to the prior art GMSK demodulator described above is useful for demodulating the inventive QO-GMSK signal. The improvement comprises using the non-linear equations (1,2) above together with channel coefficients to predict received I, Q values. Its application to QO-GMSK will be described in more detail after describing the generation of QO-GMSK signals.

Figure 6:
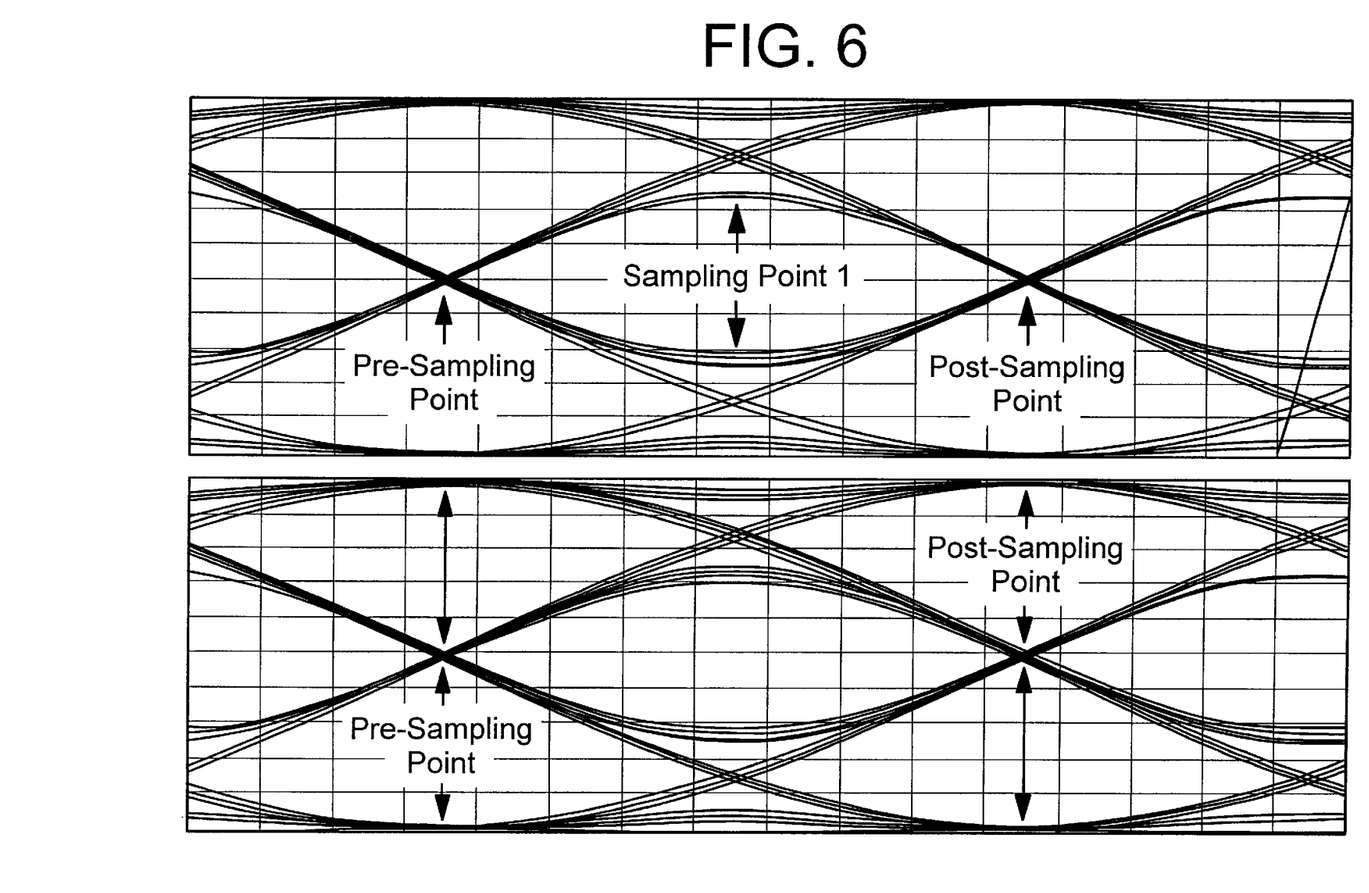
FIG. 6 illustrates QO-GMSK waveforms for BT=0.5 according to one embodiment of the present invention.
Figure 7:
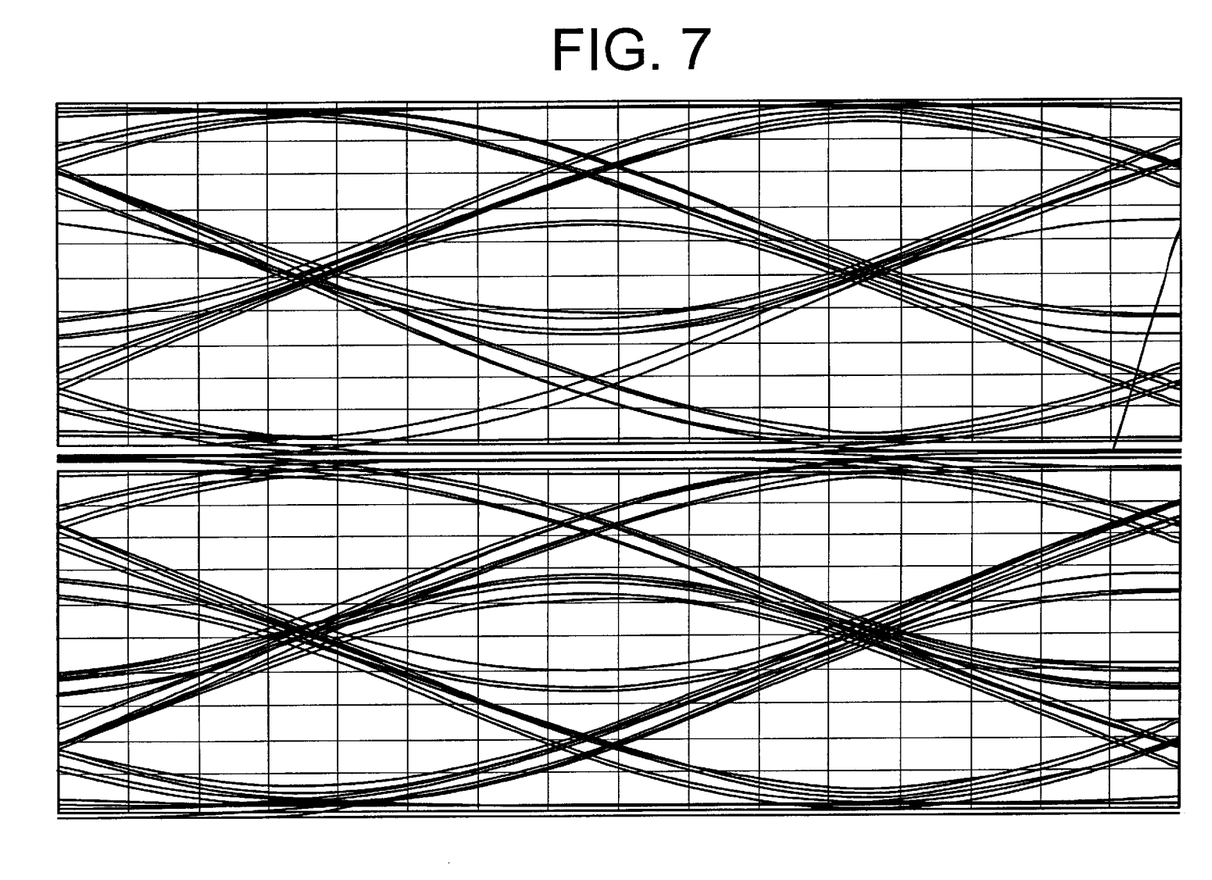
FIG. 7 illustrates QO-GMSK waveforms for BT=0.3 according to one embodiment of the present invention.
Figure 8:
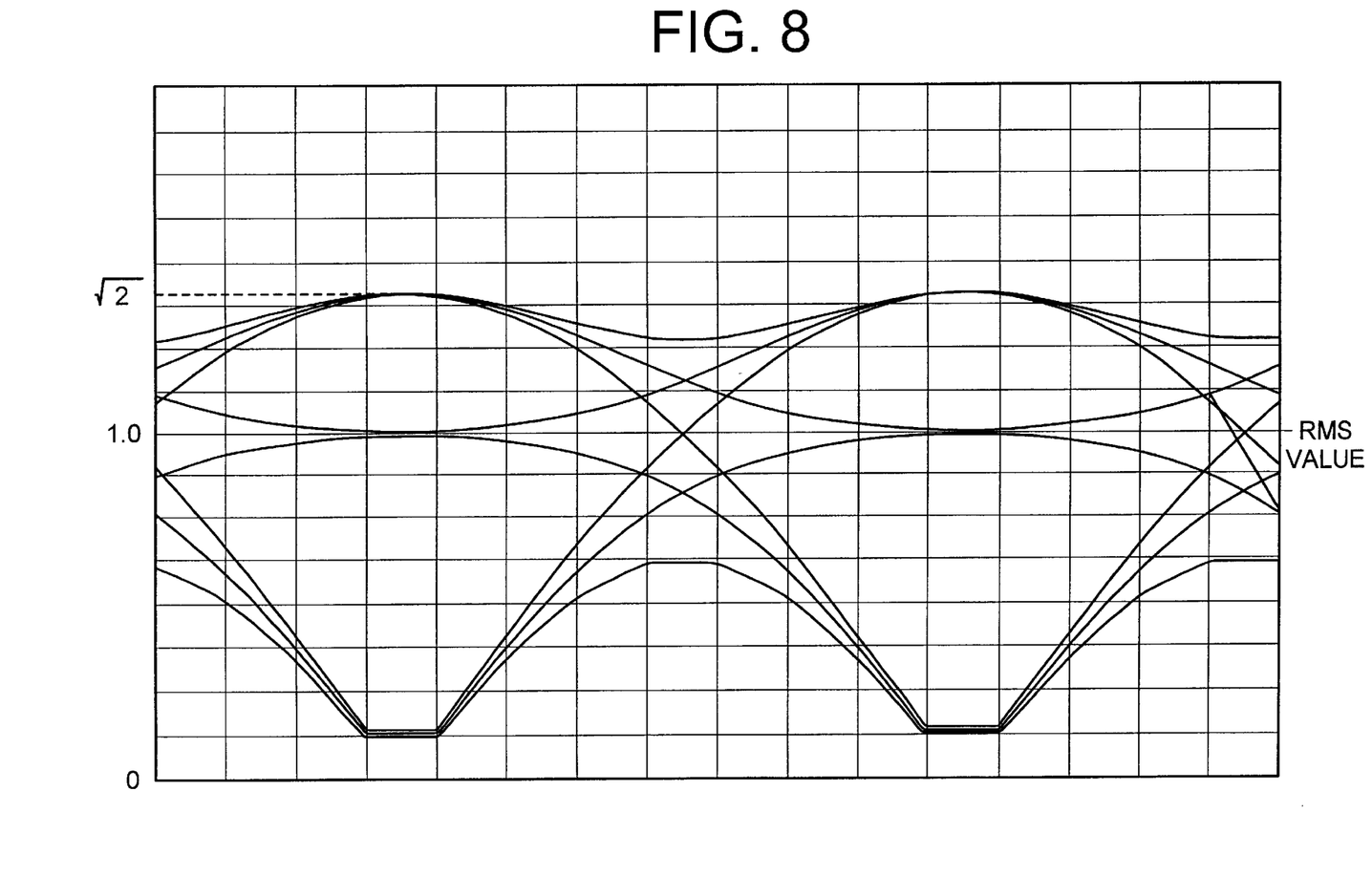
FIG. 8 illustrates QO-GMSK amplitude variation.

FIG. 6 shows the QO-GMSK waveforms that result when two GMSK waveforms of the type given in FIG. 3 (BT=0.5) are added with a 90° phase difference. FIG. 7 shows QO-GMSK waveforms where BT=0.3. A first GMSK waveform is computed using bits A(1), A(2)... and a second waveform is computed using bits B(1), B(2) After rotating through 90° the first waveform is added to the second waveform. Thus, the Q-waveform (of FIG. 3) due to the B-bits is, after 90° rotation, added to the I-waveform of the A-bits, and vice versa. The resulting QO-GMSK waveform is not a constant-envelope modulation, but the amplitude varies as is shown in FIG. 8. The amplitude takes on one of five values at the nominal bit-sampling instants or one of the three values 0, 1 or $\sqrt{2}$ at points in between. The peak-to-rms ratio for the modulation is 3 dB.

The waveform values at sampling point 1 in FIG. 6 are thus the result of adding the I and Q waveforms at the same point of FIG. 3. The Q values at that point are smaller than the I values and have a limited effect, so that the eye opening is still visible. The Q-waveform values of FIG. 6 are the result of adding the I-waveforms of FIG. 3 to the Q-waveforms, and thus attain precisely the same shape as the QO-GMSK I-waveforms, instead of being time-displaced by one bit period as in the GMSK waveforms of FIG. 3.

The I-waveform at sampling point 1 of FIG. 6 is thus affected by primarily one-A-bit and two B-bits, while the Q-waveform is effected by one B-bit and two A-bits. Thus, I (at sampling point 1) =A(i)—a(B(i-0)+B(i+1)) and Q (at sampling point 1)=B(i)+a(A(i-1)+A(i+1)) where "a" is a parameter that depends on the BT value.

A more accurate non-linear model derived from equations (1) and (2) would be:

$$Qa = a(A(i-1) + A(i+1)) \quad \text{EQUATION (3)}$$

$$Ia = A(i)[1 - Qa^2]^{1/2} \quad \text{EQUATION (4)}$$

$$Qb = a(B(i-1) + B(i+1)) \quad \text{EQUATION (5)}$$

$$Ib = B(i)[1 - Qb^2]^{1/2} \quad \text{EQUATION (6)}$$

$$I = Ia - Qb \quad \text{for even numbered bit pairs} \quad \text{EQUATION (7)}$$
$$Q = Ib + Qa$$

$$I = Qa - Ib \quad \text{for odd numbered bit pairs} \quad \text{EQUATION (8)}$$
$$Q = Qb + Ia$$

Figure 9:
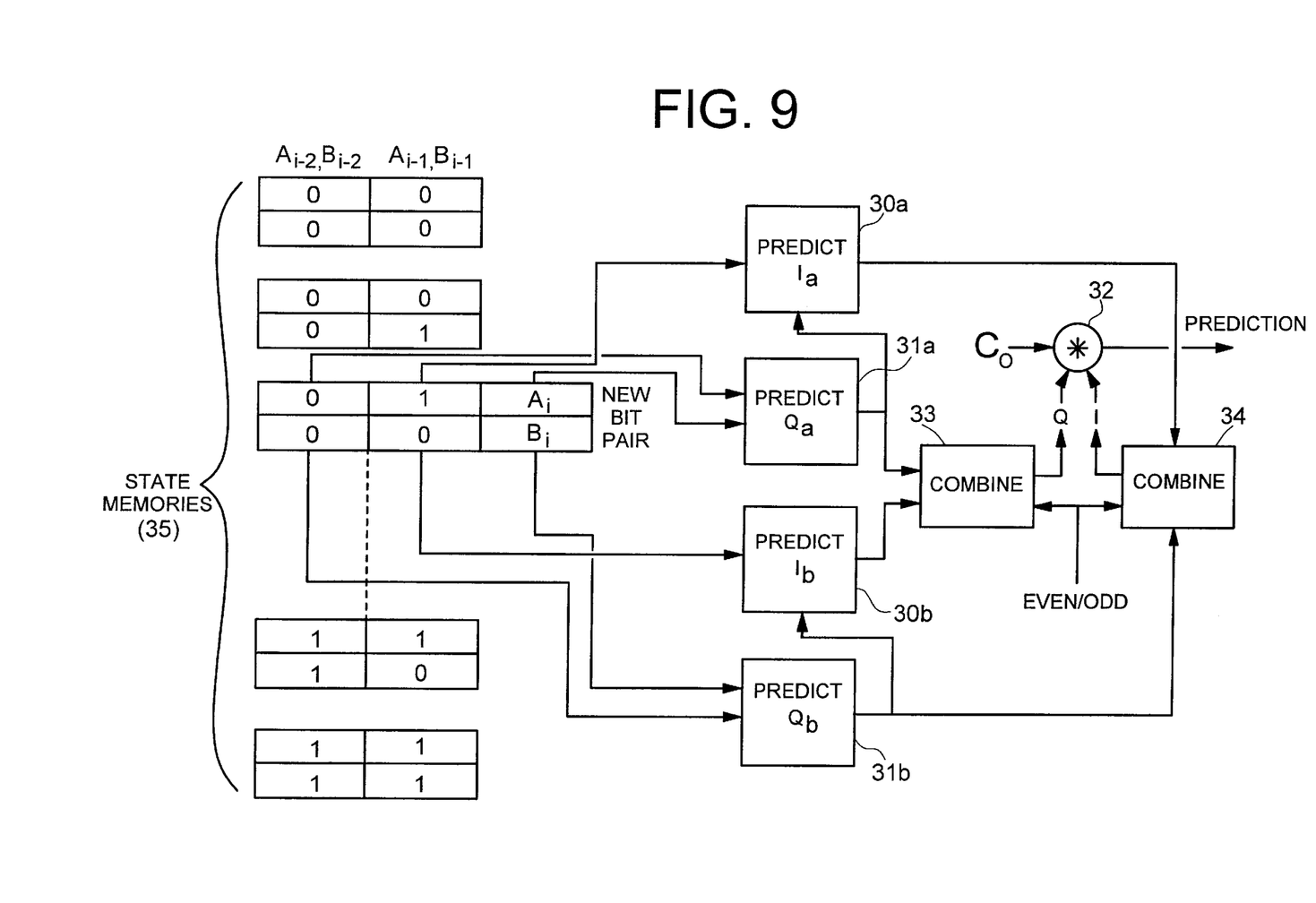
FIG. 9 illustrates a MLSE demodulator for QO-GMSK according to one embodiment of the present invention.

Using either the linear or non-linear model, the predicted values I and Q are functions of three A bits and three B bits, i.e., 6 bits or three bit-pairs in total. FIG. 9 shows the adaptation of a maximum-likelihood sequence estimator to demodulate QO-GMSK bit-pairs. State memories 35 are now associated with bit-pairs sequence. For example, to test the likelihood of every possible sequence of two previous bit-pairs plus one new bit pair on which a signal I, Q value depends requires a state memory associated with every possible value of the two old bit-pairs, which makes four bits in total and thus $2^4$, that is sixteen state memories.

When, for example, the hypothesis is to be tested that the previous bit pair

A(i−2) A(i−1)     0 1

B(i−2) B(i−1) was equal to  0 0 in conjunction with a new bit pair A(i), B(i) the I, Q waveform that would be expected is computed by predictors (30a, 30b, 31a and 31b) as follows. First, the Q-component Qa due to the A-bit stream from A(i-2), A(i) is predicted using equation (3) above in a prediction unit 31a, then the I-component Ia from A(i-1) and Qa is predicted using equation (4) in a prediction unit 30a. Then, the Q-component Qb due to the B-bit stream from B(i-2) and B(i) is predicted using equation (5) in a prediction unit 31b and the I-component Ib from B(i-1) and Qb is predicted using equation (6) in a prediction unit 30b. Ia and Qb are added in a combiner 34 to get a combined I-value and Qa and Ib are added in a combiner 33 to get a combined Q-value, using equation (7) for even-numbered bit pairs and equation (8) for odd-numbered bit pairs. It should be noted that equations (7) and (8) result in the need to exchange the I and Q outputs of combiners 33, 34 for odd bit-pairs. FIG. 9 does not show this, as it may be taken care of in a complex multiplier 32. An alternative method is to rotate the phase of received signal samples progressively by multiples of 90°, that is sample number "n" in sequence gets rotated by nx90°. In conjunction with precoding as specified in the GSM GMSK modulation standard, this eliminates the need to flip the I and Q predictions for alternate bit pairs. Finally, the I, Q prediction is multiplied by the channel estimate Co using the complex multiplier 32.

The prediction calculated above is used in a Viterbi MSLE processor as described in FIG. 4, with the difference that four candidate predecessors have to be compared and the candidate predecessor which generates the lowest cumulative metric is selected to be the predecessor to a new state containing the new bit pair in the rightmost position of the state number.

As described for GMSK, when the receiver bandpass filter or the propagation path gives rise to linear, additive intersymbol interference, the prediction method of FIG. 9 can be extended to include computing a weighted sum of I, Q values computed using different shifts of three bit pairs selected from an extended state memory, using more than one channel coefficient as complex weights, in order to account for the ISI introduced by the combined impulse response of the channel and the receiver filter. The optimum non-linear receiver structure for the inventive QO-GMSK modulation may be derived from the work of Forney on linear receivers as described in "Maximum Likelihood Sequence Estimation of Digital Sequences in the Presence of Intersymbol Interference," *Trans IEEE on Information Theory*, Vol. IT18, No. 3, May 1972, page 363. The Forney receiver for QO-GMSK passes the received signal plus noise through a receiver filter having the same shape as the signal spectrum transmitted. The signal spectrum for QO-GMSK is the same as the signal spectrum for GMSK. The signal is then sampled at symbol-period intervals. The symbols in QO-GMSK comprise bit-pairs, and the symbol period interval for QO-GMSK is the same as the bit period interval of the underlying GMSK signals. The signal samples are then processed in a noise-whitening filter. The noise-whitening filter comprises forming a weighted sum of samples over a sliding window. The weights are chosen in dependence on the correlation of the noise from sample to sample, which is largely due to the receiver filter's bandwidth restriction. The weights are chosen so that the output samples of the noise-whitening filter have the noise correlation between successive samples cancelled out. The noise on the output samples is then described as "serially uncorrelated." Finally, the output samples from the noise-whitening filter are then processed using a maximum-likelihood sequence estimator employing non-linear prediction adapted to the QO-GMSK modulation as in FIG. 9. The MSLE machine uses a number of channel coefficients that are chosen to account largely for echoes in the propagation path, but more strictly are chosen to account for the combined effects of the propagation path, the receive filter and the noise-whitening filter.

Equations (1–8) are applicable when the signal is sampled at the point denoted by SAMPLING POINT 1 in FIG. 6, corresponding to the point of maximum eye opening for the GMSK signal shown in FIG. 2.

Alternative sampling points denoted by the PRESAMPLING point and the POSTSAMPLING point in FIG. 2 for GMSK and FIG. 6 for the QO-GMSK may also be used. At these points, the GMSK signal is seen to take on one of four approximate values, where the I signal and the Q signal each equal either $1/\sqrt{2}$ or $-1/\sqrt{2}$. The signal at these points may therefore be denoted by $$\frac{\pm 1 \pm j}{\sqrt{(2)}}$$

When two GMSK signals are added together to make a QO-GMSK signal, and the sum is further scaled by $1/\sqrt{2}$ to maintain the same mean power level as a single GMSK signal, the resultant at the pre- and post-sample points is described by $$\frac{\pm 1 \pm j \pm 1 \pm j}{2} \text{ which takes on the values } \begin{array}{cc} 1 & + \quad j \\ 0 & 0 \\ \text{or } -1 & \text{or } -j \end{array}$$

It may be clearly seen that both the I and Q components are three-valued at the pre- and post-sampling points.

The information obtained by determining which of the above nine complex values $1+j$, $0+j$, $-1+j$, $1+j0$, $0+j0$, $-1+j0$, $1-j$, $0-j$, $-1-j$ was received does not yield four bits of information, but $\log_2(9)$ or just over three bits of information. However, by determining which of nine values was received at both the pre-sampling point and the post-sampling point, more than sufficient information is obtained to determine four data bits per period, where a period comprises the interval depicted in FIGS. 2 and 6.

By reference to FIG. 2, it may be observed that the I-components derived from the A-bit stream have the same values at the pre- and post-sampling points as they are derived from the same A-bit. Likewise, the Q-components due to the B-bit stream will be the same at the pre- and post-sampling points as they are derived from the same B-bit. On the other hand, the I-components due to the B-bit stream at the pre- and post-sampling points are due to different B-bits. However, the I values at the pre-sampling point and the previous post-sampling point depend on the same B-bit, as do the I-values at the post-sampling point and the next pre-sampling point.

Denoting the current pre-sampling and post-sampling point values in window (k) by $$I1(k) + jQ1(k) \quad \text{(Pre-sampling Values)}$$

$$\text{and} \quad I2(k) + jQ2(k) \quad \text{(Post-sampling Values)}$$

we can express these values approximately as $$I1(k) = (A(2k) + B(2k-1))/2 \qquad \text{EQUATION (9)}$$

$$Q1(k) = (B(2k) + A(2k-1))/2$$

$$I2(k) = (A(2k) + B(2k+1))/2$$

$$Q2(k) = (B(2k) + A(2k+1))/2$$

Since equations (9) express the expected I, Q values as linear functions of the A and B-bit sequence, the data bits may be decoded by using a linear MSLE machine provided the signal is sampled at the pre- and post-sampling points. However, use of the pre- and post-sampling points enables the use of an MLSE machine having only four states instead of 16, as follows.

Assume that point I1, Q1 has just been received and is to be processed. These values are seen from equation (9) to depend on one new bit pair A(2k), B(2k) and one old bit pair A(2k–1), B(2k–1). Four states are required to hold metrics and path histories for every possible value of the two previous bits A(2k–1) and B(2k–1). Two new bits A(2k), B(2k) are now hypothesized and I1, Q1 are predicted using the first two of equations (1). After scaling with a channel coefficient to account for propagation path phase and attenuation (using the multiplier 32), the scaled, predicted values are compared with the received values I1, Q1 and the square mismatch is calculated. The square mismatch is added to the old path metric for the particular old bit pair A(2k–1), B(2k–1) used to obtain a new cumulative path metric associated with that predecessor bit pair. For a given new bit-pair hypothesis, e.g., 00, a new cumulative path metric is computed using each of the four possible predecessor bit-pairs in turn and then the lowest of the four new metrics is selected. The old bit-pair that gave rise to the lowest metric is then placed into the path history of new state 00 and the lowest metric is retained for that state. By testing each hypothesis for new bits A(2k), B(2k) in turn, new states 00, 01, 10, 11 are generated in the above manner.

Now the signal at the post-sampling point is sampled to obtain I2, Q2. It may be noted from equations (9) that I2, Q2 no longer depend upon A(2k–1) and B(2k–1), which justifies their removal from the state number to the path history. I2, Q2 depends on bits A(2k+1), B(2k+1) and on A(2k), B(2k), all possible values of which were hypothesized above and the results retained in the four new states. Now, the new bit pair A(2k+1), B(2k+1) must be hypothesized in conjunction with the previous bit pair A(2k), B(2k) that are now committed to the four states. Using the latter two of equations (9), I2(k), Q2(k) are then predicted, scaled and compared with the received signal to generate four successor states associated with the four possible values of A(2k+1), B(2k+1).

When in the next time window the next pre-sample is received, that is values for I1(k+1) and Q1(k+1), they are predictable using the first two of equations (9) with "k" incremented by one. The process thus repeats, processing alternately a pre-sample and a post-sample after which four best states are retained and the associated path histories are lengthened by one more decoded bit pair for each sample processed. The path histories may be shortened whenever the oldest bit-pair agrees in every state, or may be forcibly truncated by selecting the oldest bit-pair from the state having the lowest cumulative path metric, which is indicative of greatest likelihood of being correct.

Still another form of MLSE receiver called a "fractionally spaced" MLSE machine may be used to process both received samples collected at sampling points 1 together with samples collected at the pre- and post-sampling points. The MSLE machine in this case uses the 16-state algorithm according to FIG. 9 to process sampling point 1 values alternating with the four-state algorithm used to process pre- or post-sample values. However, the four-state algorithm is never collapsed to only four states by selecting the best of four predecessors, and all sixteen states are retained because they will be needed for processing the next sample-1 point. The advantage of the fractionally-spaced MSLE approach is to avoid failure to decode a possible sequence of data bits which result in the pre- and post-sample values all being zero. Even when the pre- and post-sample values are zero for several samples in succession, the sample-1 values are never zero and steer the decoder to make correct decisions.

The inventive QO-GMSK signal described above has the advantage that it may be generated by adding together two constant envelope GMSK signals. Thus, a cellular base station equipped to generate GMSK signals for communication with a plurality of mobile stations may be employed to generate two GMSK signals on the same channel frequency using two constant-envelope GMSK transmitters, observing the 90° relative phase shift between the signals which is recommended for simplifying reception of QO-GMSK using the above-described methods. The resulting QO-GMSK signal may be used to transmit double the information rate to one mobile station or to communicate the same information rate to two mobiles simultaneously using the same channel frequency, thus doubling capacity.

The inventive QO-GMSK modulation permits other related modulations to be derived, having advantageous properties. A linear equivalent modulation to GMSK is Offset QPSK (OQPSK) in which alternate data bit values are carried on the I and Q channels. OQPSK is not produced by a constant-envelope phase or frequency modulation however, but is produced by generating a first, filtered binary modulation signal using even bits impressed on a cosine carrier wave, and a second filtered binary modulation by impressing the odd bits on a sine carrier wave. After adding the modulated cosine and sine waves the amplitude of the composite complex signal is not however guaranteed to be constant.

If two such OQPSK signals are added together with a 90° phase shift, a modulation similar to QO-GMSK is produced, which is its linear equivalent. The linear equivalent modulations have advantages in spectral containment over modulations generated from constant envelope modulations. The linear equivalent of QO-GMSK may be termed Quadrature-Overlapped Offset QPSK or QO-OQPSK. QO-OQPSK has an I-component that is the linear sum of a first binary modulation produced by even numbered bits of an A bitstream with a second binary modulation produced by odd-numbered bits of a B bitstream having their bit intervals half overlapped with those of the A bitstream. The Q component is likewise the product of odd-numbered A-bits and even numbered B-bits. Both the I and the Q component exhibit the three-level form of the QO-GMSK signals at the pre- and post-sampling points and are related to the prior art modulations such as duobinary and tamed frequency modulation (TFM). Both duobinary and TFM are partial-response modulations that are used over a single-phase channel, such as a pair of telephone wires in the former case or over a frequency-modulated radio channel in the latter case. Duobinary transmits a signal proportional to current bit minus previous bit, which has a zero DC component and is thus particularly suited to pass through telephone line transformers. Tamed frequency modulation is formed by passing a binary bitstream through a filter having a transmission zero at half the bitrate, thus suppressing sequences of alternating bit polarity 101010 to a flat or zero modulation signal.

The inventive QO-GMSK and particularly its linear equivalent QO-OQPSK described above also produce a zero signal value on either the I or Q channel or both when the data bits on which the signal depend alternate in polarity. This may be seen from equations (9) which indicate that I1(k) is zero, for example, when A(2k)=−B(2k−1). All four of equations (9) are similar to the equation for duobinary, so that the inventive modulation may be equated to the use of duobinary on both the I and Q channels simultaneously.

Figure 10:
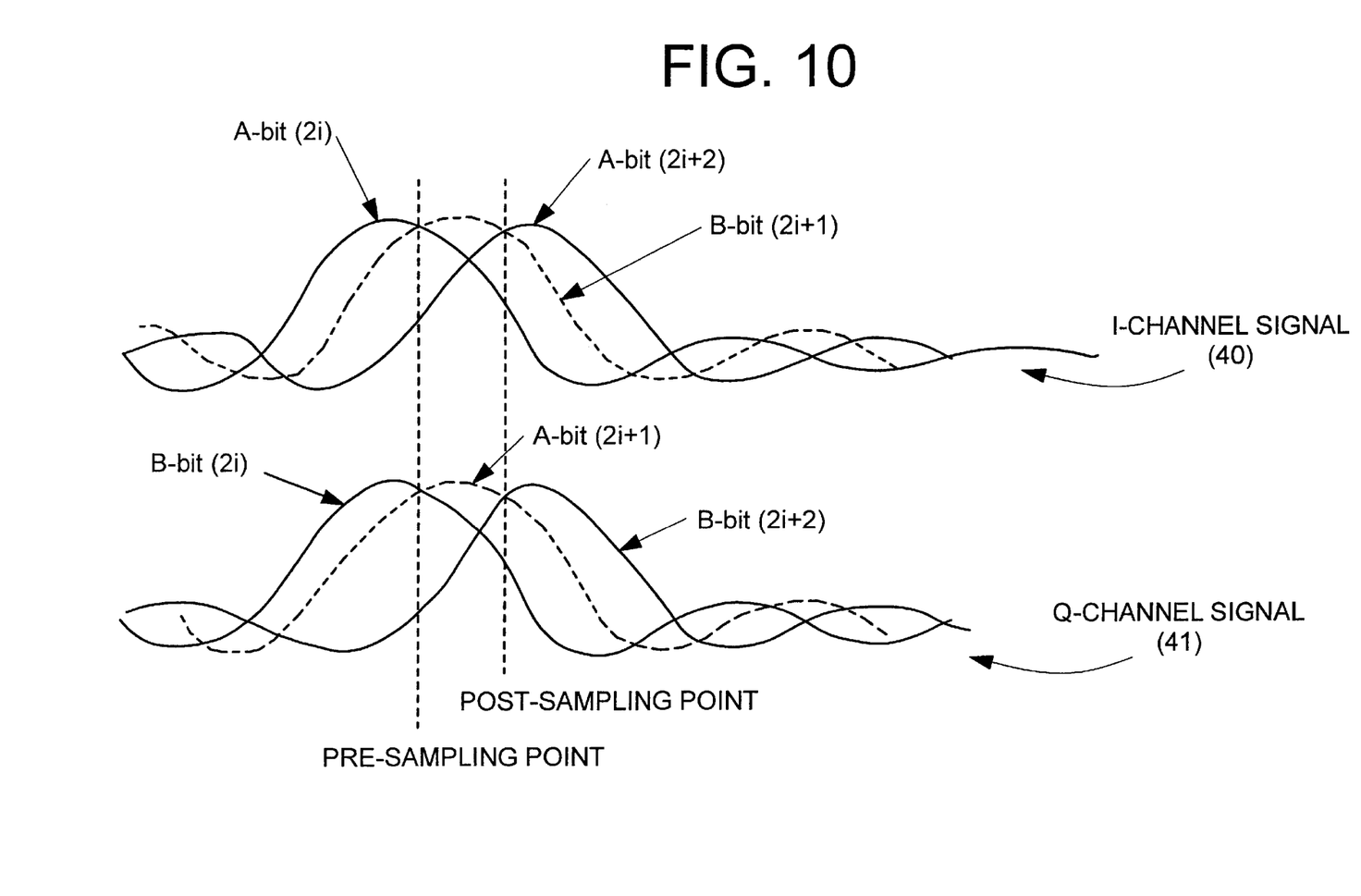
FIG. 10 illustrates overlapped pulse shapes.

FIG. 10 shows an alternate view of quadrature-overlapped modulations. An I-channel signal 40 is formed by superposing pulse shapes that derive from applying an impulse of area +1 or −1 to a filter, the impulse sign depending on the data bit polarity. The filter rings in response to the impulse with a characteristic waveform called the filter impulse response. The impulse response is the Fourier transform of the filter's frequency response. For convenience, all the impulse responses are shown with the same sign. Normally, for Nyquist signalling without Intersymbol Interference, only the impulse responses labelled as being generated by A-bit(2i) and A-bit(2i+2) are used on the I-channel (and B-bit(2i) and (2i+2) on the Q-channel. ISI is avoided by choosing a filter whose impulse response goes through zero at multiples of the bit period away from the peak, ensuring no interference with the peak values of any other bit-impulses. Such a filter is known as Nyquist filter.

By overlapping another signal generated from a separate bitstream offset from the first however, the impulses drawn in dashed lines and labelled as being due to B-bit(2i+1) on the I channel and A-bit(2i+1) on the Q-channel are superposed. For the same filter bandwidth, the impulse responses of bits A(2i) and A(2i+2) on the I-channel are not zero at the peak of bit B(2i+1), and on the Q-channel the impulse responses of bits B(2i) and B(2i+2) are not zero at the peak of bit A(2i+1). Instead of sampling at the peaks, but at the indicated pre- and post-sampling points, the waveform values expected are largely a function of two successive bits, and almost independent of the others, whose impulse responses are smaller at that point. At the pre-sampling point for example, the I-waveform depends mainly on A(2i) and B(2i+1) and little on A(2i+2). At the post-sampling point, the I-waveform depends largely on B(2i+1) and A(2i+2). If desired, a non-Nyquist filter of slightly wider bandwidth can be used which forces the A(2i+2) impulse to pass exactly through zero at the conjunction of the A(2i) and B(2i+1) impulses.

Define new bitstreams A' and B' as follows:

A'(1,2 ... n)= ... A(2i), B(2i+1), A(2i+2),B(2i+3) ...

B'(1,2,3 ... n)=. . . B(2i),A(2i+1),B(2i+),A(2i+3). . . it may be seen that the I-waveform depends now only on the A' bitstream and the Q-waveform depends only on the B' bitstream. In the absence of I, Q cross-coupling caused by time-dispersion or echoes in the channel, the I and Q streams may be decoded separately to yield the A' and B' bitstreams respectively, which are then merged to yield the A and B bitstreams. In terms of A' and B' bits, equations (9) become:

$$I1(k) = (A'(2k) + A'(2k-1))/2 \quad ) \qquad \text{EQUATION (10)}$$

$$Q1(k) = (B'(2k) + B'(2k-1))/2 \quad )$$

$$I2(k) = (A'(2k) + A'(2k+1))/2 \quad )$$

$$Q2(k) = (B'(2k) + B'(2k+1))/2 \quad )$$

Equations (10) may then be partitioned into:

$$I1(k) = (A'(2k) + A'(2k-1))/2 \quad ) \qquad \text{EQUATION (11)}$$

$$I2(k) = (A'(2k) + A'(2k+1))/2 \quad )$$

$$Q1(k) = (B'(2k) + B'(2k-1))/2 \quad ) \qquad \text{EQUATION (12)}$$

$$Q2(k) = (B'(2k) + B'(2k+1))/2 \quad )$$

where equations (11) may be used in a two-state MSLE machine to decode successive I-values i1(k), I2(k), i1(k+1),i 2(k+1)... to yield bitstream A', while equations (12) may be used in a parallel two-state MSLE machine to decode successive Q-values Q2(k), Q2(k), Q1(k+1), Q2(k+1)... to yield the B' bitstream. This partitioning into separate I and Q MSLE machines is however only straightforward when the propagation path does not have time-dispersion or delayed echoes, and is described by the single channel coefficient Co which comprises the path phase shift and attenuation. It may still be possible to achieve a partitioning into separate I and Q decoders when the propagation path involves time-dispersion or echoes, by using a so-called transversal filter to cancel the echoes ahead of decoding. The transversal filter must be the inverse of the channel and this is not always mathematically well-disposed to inversion. For example, when the channel, due to a delayed echo, exhibits a null in the propagation frequency response, the inverse channel will need to include an infinite peak to compensate it, with consequent noise magnification. For this reason, full MSLE rather than the simplified, I-Q partitioned MSLE approach is generally to be preferred.

The invention of quadrature overlapped GMSK modulation has been described in terms of its generation at the transmitter and decoding at the receiver, along with related or derived inventive modulations, many more of which may be devised by persons skilled in the art without departing from the spirit and scope of the invention as described by the following claims.

What is claimed is:

1. A method for predicting signal values for signals that have not yet been received wherein the information stream transmitted has been divided into a first stream and a second stream, comprising:

predicting a first Q component based on values stored in a state memory for the first bit stream;

predicting a first I component using the first predicted Q component and a previous bit from the state memory for the first bit stream;

predicting a second Q component based on values in the state memory for the second bit stream;

predicting a second I component using the second predicting Q component and the previous bit from the second bit stream;

adding the first I component and the second Q component to obtain a combined I value;

adding the first Q component and the second I component to obtain a combined Q value; and inputting the combined I value, the combined Q value, and a channel coefficient into a complex multiplier, wherein the complex multiplier outputs a signal predicting value.

2. A method according to claim 1, wherein the channel coefficient describes the propagation path phase shift in amplitude attenuation.

3. A method according to claim 1, wherein the first Q component is predicted using a new bit and a prior bit, the prior bit being two bits prior to the new bit.

4. A method according to claim 1, wherein the first I/Q component is predicted using a new bit in the second bit stream and a prior bit, the prior bit being two bits prior to the new bit.

5. An apparatus for predicting signal values for signals that have not yet been received, wherein the information stream transmitted has been divided into a first stream and a second stream, comprising:

means for predicting a first Q component based on values stored in a state memory for the first bit stream;

means for predicting a first I component using the first predicted Q component and a previous bit from the state memory for the first bit stream;

means for predicting a second Q component based on values in the state memory for the second bit stream;

means for predicting a second I component using the second predicting Q component and the previous bit from the second bit stream;

means for adding the first I component and the second Q component to obtain a combined I value;

means for adding the first Q component and the second I component to obtain a combined Q value; and means for inputting the combined I value, the combined Q value, and a channel coefficient into a complex multiplier, wherein the complex multiplier outputs a signal predicting value.

6. An apparatus according to claim 5, wherein the channel coefficient describes the propagation path phase shift and amplitude attenuation.

7. An apparatus according to claim 5, wherein the first Q component is predicted using a new bit and a prior bit, the prior bit being two bits prior to the new bit.

8. An apparatus according to claim 5, wherein the first I component is predicted using a new bit in the second bit stream and a prior bit, the prior bit being two bits prior to the new bit.

* * * * *